Jan. 14, 1958 G. P. KRAUSE 2,820,132
EXTRUSION PRESS CONTAINER
Filed Nov. 19, 1953
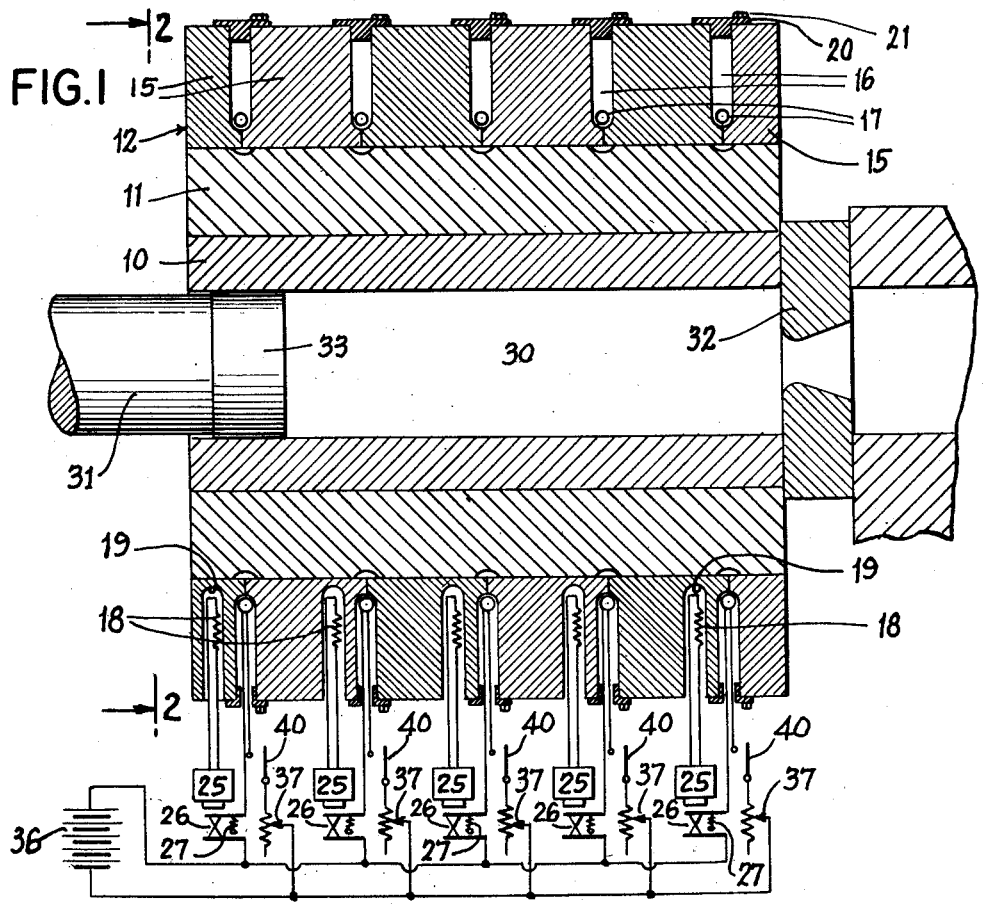
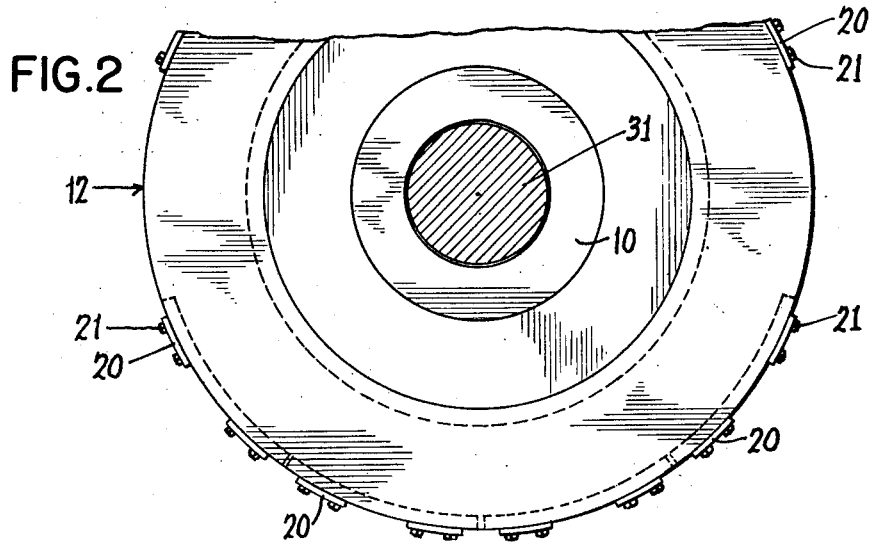

United States Patent Office 2,820,132
Patented Jan. 14, 1958

2,820,132

EXTRUSION PRESS CONTAINER

Gerhard P. Krause, Harrison, N. Y., assignor, by mesne assignments, to Baldwin-Lima-Hamilton Corporation, Philadelphia, Pa., a corporation of Pennsylvania Application November 19, 1953, Serial No. 393,030

4 Claims. (Cl. 219—36)

This invention relates to extrusion presses employed in the process of hot extrusion of metals and alloys. More particularly, the invention relates to the containers of such presses of large capacity where the containers may weigh 100 tons or more so that they are difficult to manufacture due to the heavy mass of material involved. Further, since the billet which is placed in the container is preheated to a high temperature (for example, an aluminum alloy billet is preheated to approximately 900° F.), it is necessary to maintain the temperature of the container so that substantially little differential exists between it and the billet, otherwise the temperature of the billet would be changed substantially upon contact with the container. Furthermore, the supply of heat along the length of the container must be varied in accordance with the variations which prevail as a result of regions of different rates of heat radiation in order that the container may be maintained at substantially uniform temperature along its length to avoid deformation and possible cracking or failure of the container. The problem of designing a container for large capacity extrusion presses is thus two-fold. First, there is the problem of constructing a container of the required size. Second, there is the problem of properly controlling the heat distribution and radiation along its length to avoid deformation. These two problems are interrelated, and it is therefore one of the principal objects of this invention to provide a construction of large capacity container which can be easily manufactured, and which will permit adequate heat control so as to avoid deformation and dangerous heat distortion.

Further objects and advantages of this invention will become apparent in the following detailed description thereof.

In the accompanying drawings,

Fig. 1 is a vertical section through an extrusion press container embodying one form of this invention.

Fig. 2 is a section taken on the line 2—2 of Fig. 1 with the upper portion broken away.

Referring to the drawings, there are shown the parts of an extrusion press container comprising an inner cylindrical tubular liner 10, a cylindrical tubular liner holder 11, and an outer casing 12. The metal to be extruded is positioned within the cavity 30 of liner 10, and a ram 31 and pressing disc 33 are operated to force the metal through a die 32. Heretofore the outer casing was made of one large forging, but it was found to be difficult to construct a casing of the size and weight required in large capacity extrusion presses. Heat control was effected by holes drilled longitudinally in the casing to support electrical heating elements therein, but such construction was subject to the difficulties set forth in the introduction hereto, i. e., inadequate localized control of heat in the various regions along the length of the container with consequent deformation of the container casing. At the same time, it is very difficult to drill longitudinal holes in large containers.

By this invention these problems are solved. A container casing of any desired size may be readily constructed, and furthermore, the heat control of the individual regions along the length of such casing may be effectively accomplished. For this purpose, the casing 12 is constructed of a series of rings 15 positioned along the length of the cylindrical parts 10, 11, by shrinking the rings upon the liner holder. The rings are positioned side by side to form a continuous body. By this method, containers of exceptionally large capacity, having a weight on the order of 100 tons or more, can be constructed without difficulty.

The construction of the casing in the form of a series of rings permits a convenient heating arrangement avoiding the drilling of longitudinal holes and, at the same time, facilitates the temperature control of the casing. Between each pair of adjacent rings a circumferential cavity or groove 16 is formed from the outer periphery inwardly toward a point relatively close to the inner periphery, in each of which grooves a temperature contol element 17 is positioned. Such temperature control element may be a heating element, such as an electrical resistance, or it may be a cooling unit. As shown, each control element 17 in the form of an electric heating element may be connected to a source of current 36 through a potentiometer 37 to maintain the proper temperature for the unit of casing length which it controls, and each element may be provided with its individual thermostat control 18 which may be enclosed in a hole 19 drilled into the respective casing section 15 adjacent the heating element which it controls. The control 18 may operate in the usual manner through a Wheatstone bridge and relay arrangement 25 to open a set of contacts 26 when a predetermined temperature is reached. The contacts 26 are normally held closed by spring 27. In this manner, more heat may be supplied to the ends of the container, for example, to compensate for greater radiation in these unit lengths, while less heat, or even cooling coils, may be provided at the center portions. Thus, differential heat control over the entire length of the container body is obtained as may be necessary to maintain the casing at uniform temperature and thus prevent deformation. Each heat control element 17 may be provided with its individual control switch 40 so that any combination of heating elements may be employed. Thus at the very beginning of the operation, when it is desired to heat the casing quickly, all switches 40 may be closed so that all heating elements are operating. As the operation progresses, it may be desirable to cut out certain of the heating elements. If these steps occur in regular progression, a selector switch of known design may be provided so that operation of the selector switch handle to successive steps will close the circuits through certain of the heating elements while leaving the circuits through the remaining elements open.

The grooves may be closed at their outer periphery by covers 20 fastened to the casing rings 15 by screws 21.

Having described my invention, what I claim and desire to secure by Letters Patent is:

1. A container for a metal extrusion press, said container comprising an inner tubular member, an outer casing mounted on said member, said casing being composed of a plurality of rings positioned side by side along the length of said member, said tubular member being adapted to hold a metal billet to be extruded, and said tubular member and said casing being adapted to withstand the extrusion pressure, each pair of adjacent surfaces of said rings being formed to provide a circumferential cavity between the respective rings extending from the outer periphery of the casing inwardly toward a point closely adjacent said inner member, and an independent temperature control element in each of said cavities.

2. A container for a metal extrusion press, said container comprising an inner tubular member, an outer casing mounted on said member, said casing being composed of a plurality of rings shrunk upon said member and positioned side by side along the length thereof, said tubular member being adapted to hold a metal billet to be extruded, and said tubular member and said casing being adapted to withstand the extrusion pressure, each pair of adjacent surfaces of said rings being formed to provide a circumferential cavity between the respective rings extending from the outer periphery of the casing inwardly toward a point closely adjacent said inner member, an independent temperature control element in each of said cavities, and means for selectively rendering the respective elements effective and ineffective.

3. A container as specified in claim 1, in which each temperature control element is in turn controlled by a respective temperature responsive element.

4. A container as specified in claim 1, in which each temperature control element is provided with means for rendering the element effective or ineffective at will.

References Cited in the file of this patent

UNITED STATES PATENTS

| | | |
|---|---|---|
| 1,370,800 | Egerton | Mar. 8, 1921 |
| 1,857,725 | Lassen | May 10, 1932 |
| 2,140,825 | Zuckert | Dec. 20, 1938 |
| 2,435,426 | Davies | Feb. 3, 1948 |
| 2,694,741 | Rice | Nov. 16, 1954 |

FOREIGN PATENTS

| | | |
|---|---|---|
| 17,829 | Great Britain | Sept. 4, 1899 |
| 648,331 | France | Aug. 13, 1928 |
| 863,259 | France | Jan. 2, 1941 |